Sept. 12, 1944. P. W. KRIDLER 2,358,079
FISH LURE
Filed June 18, 1943
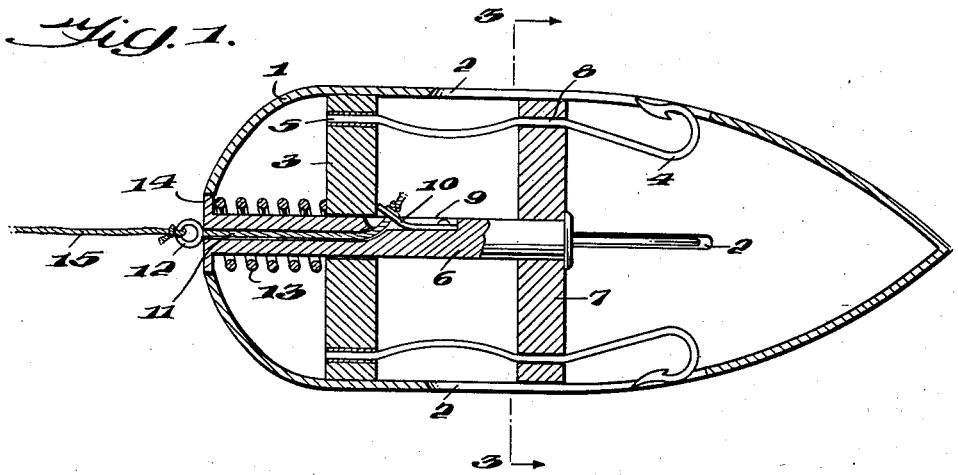
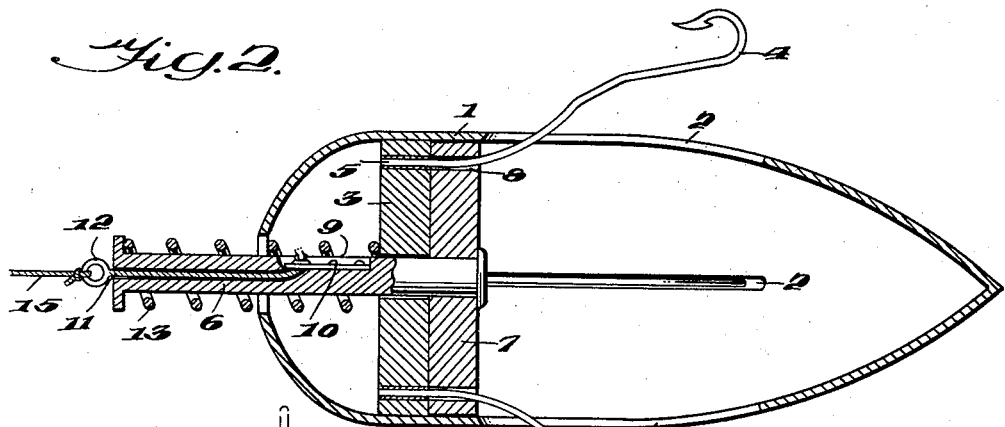
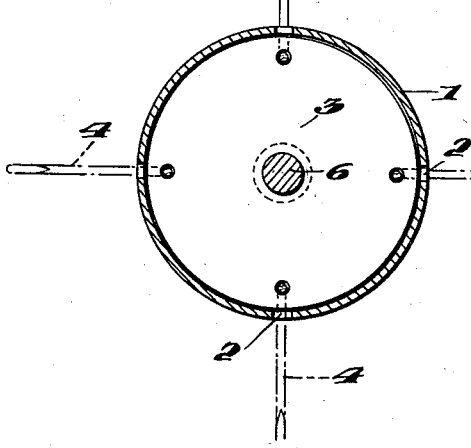
Inventor
PHILLIP W. KRIDLER,
By J. Windsor Davis
Attorney

UNITED STATES PATENT OFFICE 2,358,079

FISH LURE

Phillip W. Kridler, Detroit, Mich.

Application June 18, 1943, Serial No. 491,343

2 Claims. (Cl. 43—36)

This invention relates to fish lures and has for its object to provide a lure which can be used in lakes and streams having grass and weeds therein which interfere with the use of a conventional hook and line.

It will be realized that when a hook is pulled through water in which grass and weeds are encountered after casting and when fishing from a moving boat, the line may be broken or the bait may be pulled off and, in any case, the fisherman receives a false pull or tug on the line. It is therefore the principal object of this invention to provide a lure which will attract fish by reason of its size, shape and general appearance and which, upon being struck by a fish will release a plurality of hooks out of its contour.

A specific object is to provide a lure composed of a body resembling a small fish or minnow which houses a plurality of hooks together with a releasing means for causing the hooks to project outwardly of the body on being struck by a fish, the releasing means being composed of a minimum number of sturdy and reliable parts.

Another object is to provide a lure which can be set, ready for casting with small danger to the fisherman and which will not release its hooks by the motion of casting.

A further object is to provide a lure comprising retractible hooks of spring like material and capable of being flexed into a retracted position together with spring release means movable to permit the hooks to project outwardly of the body either by a sharp jerk on the line or by a sharp jerk on the body.

Other objects and advantages will become hereinafter more fully apparent as reference is had to the accompanying drawing in which Figure 1 is a central longitudinal section through the lure with the hooks in retracted position, Figure 2 is a view similar to Figure 1 with the hooks in extended position, and Figure 3 is a diametric section taken along the line 3—3 of Figure 1.

More particularly 1 indicates a hollow body or shell made to resemble generally a small fish or minnow through which a plurality of slots 2 are formed. Internally of the shell 1 a member 3 is fixedly secured thereto near the front end thereof. The member 3 is an anchorage member for a plurality of fish hooks 4 secured thereto at 5, there being one hook for each slot 2.

The member 3 has a central opening therethrough in which a shaft 6 is slidably mounted and on one end of this shaft 6 a disc-like member 7 is secured. A plurality of openings 8 are provided in the member 7 near the periphery thereof and a fish hook 4 is threaded through each of these openings.

The hooks 4 are each bent or curved along their length so that as the member 7 is moved by the shaft 6 to its extreme position away from the anchorage member 3 the hooks 4 are retracted within the body 1 as illustrated in Figure 1. The shaft 6 is notched out at 9 and a spring latch member 10 is anchored at one end in the bottom of the notch, the other end projecting outwardly of the notch for engagement with the anchorage member 3 thus retaining the member 7 in hook retracting position.

Centrally through the shaft 6 a cable 11 is threaded, one end being attached to the outer end of the latch member 10 and the other end to a ring 12 so that a relative pull between the ring and the body 1 will cause the latch member 10 to be drawn into the notch 9, thus releasing the latch.

Around the shaft 6 forwardly of the anchorage member 3 is a coil spring 13 which abuts against an enlarged end 14 on the shaft 6. Thus when the latch member 10 is withdrawn the spring 13 forces the shaft 6 and the disc 7 towards the member 3 thus causing the outer ends of the hooks 4 to project outwardly of the body 1.

It will be noted that in order to cock the lure it is only necessary to grip the body 1 and to push inwardly on the end 14 of the shaft 6, and it is not necessary to grip the hooks 4.

The ring 12 is secured to a fishing line 15. A sudden jerk on the line 15 by the fisherman or a pull on the body 1 by a fish will cause the latch 10 to release.

Various small changes in design and formation of individual parts may be made without departing from the spirit of my invention and I therefore desire to be extended protection as defined by the appended claims.

What I claim is:

1. A fish lure comprising a body generally resembling a small fish and having a plurality of slots therethrough, said body having a fish hook anchorage member fixedly secured thereto near the front end thereof and having a central opening therethrough, a shaft slidably mounted in said opening, a plurality of fish hooks opposite each of said slots and having one end secured in said anchorage member, a disc member fixedly secured to one end of said shaft and having holes therethrough through each of which one of said hooks is threaded, said disc member when moved with said shaft to an extreme position away from said anchorage member retracting said hooks within said body and when moved to its other extreme position causing said hooks to project outwardly of said body, a latch member carried by said shaft for contact with said anchorage member to maintain said disc member in hook retracting position, a spring encircling said shaft on the side of said anchorage member away from said disc member adapted to force said disc member to hook projecting position upon withdrawal of said latch member, and an attaching line for said lure secured directly to said latch member.

2. A fish lue comprising a body generally resembling a small fish and having a plurality of slots therethrough, said body having a fish hook anchorage member fixedly secured thereto near the front end thereof and having a central opening therethrough, a shaft slidably mounted in said opening, a plurality of fish hooks opposite each of said slots and having one end secured in said anchorage member, a disc member fixedly secured to one end of said shaft and having holes therethrough through each of which one of said hooks is threaded, said disc member when moved with said shaft to an extreme position away from said anchorage member retracting said hooks within said body and when moved to its other extreme position causing said hooks to project outwardly of said body, a latch member carried by said shaft for contact with said anchorage member to maintain said disc member in hook retracting position, a spring encircling said shaft on the side of said anchorage member away from said disc member adapted to force said disc member to hook projecting position upon withdrawal of said latch member, and a cable extending axially through said shaft attached at one end to said latch member, said shaft being notched to receive said latch member within the contour thereof upon withdrawal thereof by said cable, said cable being attachable to a fishing line.

P. W. KRIDLER.